US006811362B2

(12) United States Patent
Wallin et al.

(10) Patent No.: US 6,811,362 B2
(45) Date of Patent: Nov. 2, 2004

(54) CONSTANT DIMENSION INSERT CUTTING TOOL WITH REGRINDABLE PROFILED INSERTS

(75) Inventors: Ernest R. Wallin, Princeton, MN (US); Jerome E. Deyle, Princeton, MN (US)

(73) Assignee: E. W. Tooling, Inc., Princeton, MN (US)

( * ) Notice: Subject to any disclaimer, the term of this patent is extended or adjusted under 35 U.S.C. 154(b) by 161 days.

(21) Appl. No.: 09/952,254

(22) Filed: Sep. 11, 2001

(65) Prior Publication Data

US 2002/0046632 A1 Apr. 25, 2002

Related U.S. Application Data

(60) Provisional application No. 60/243,186, filed on Oct. 25, 2000.

(51) Int. Cl.[7] .................................................. B23C 5/14

(52) U.S. Cl. .......................... 409/138; 409/234; 407/35

(58) Field of Search ......................... 407/34–35, 40–43, 407/47, 49, 51, 53–54, 56, 61–62, 65–66; 144/230, 218, 229, 231; 76/115; 409/138, 234; 82/1.11, 46

(56) References Cited

U.S. PATENT DOCUMENTS

| | | | | | |
|---|---|---|---|---|---|
| 1,296,536 | A | | 3/1919 | Leech | |
| 1,397,119 | A | | 11/1921 | Wiard | |
| 1,714,036 | A | | 5/1929 | Miller | |
| 1,964,130 | A | | 6/1934 | Miller | |
| 2,169,482 | A | | 7/1939 | West | |
| 2,309,657 | A | | 2/1943 | Miller | |
| 2,950,524 | A | * | 8/1960 | Frommelt et al. | 407/32 |
| 3,332,130 | A | | 7/1967 | Armstrong | |
| 3,497,934 | A | | 3/1970 | Hudson | |
| 3,921,485 | A | | 11/1975 | Tobey et al. | 83/342 |
| 3,946,474 | A | | 3/1976 | Hahn et al. | 29/105 R |
| 3,957,094 | A | | 5/1976 | Maier | 144/230 |
| 4,128,360 | A | | 12/1978 | Swenson | 407/114 |
| 4,144,678 | A | * | 3/1979 | Ellwanger et al. | 451/48 |
| 4,181,456 | A | | 1/1980 | Oaks | 407/38 |
| 4,260,002 | A | | 4/1981 | Schmalz et al. | 144/230 |
| 4,487,532 | A | | 12/1984 | Hamilton | 407/37 |
| 4,534,827 | A | * | 8/1985 | Henderson | 216/101 |
| 4,541,756 | A | | 9/1985 | Kubota | 407/45 |
| 4,592,680 | A | | 6/1986 | Lindsay | 407/36 |
| 5,063,980 | A | | 11/1991 | Schultz | 144/223 |
| 5,188,490 | A | | 2/1993 | Muendlein et al. | 408/146 |
| 5,201,613 | A | | 4/1993 | Jeffery | 407/36 |
| 5,377,454 | A | * | 1/1995 | Pedersen et al. | 451/5 |
| 5,480,343 | A | * | 1/1996 | Pedersen et al. | 451/10 |
| 5,503,588 | A | * | 4/1996 | Sweet | 451/5 |
| 5,647,699 | A | | 7/1997 | Martin et al. | 407/33 |
| 5,655,860 | A | * | 8/1997 | Oles | 409/132 |
| 5,658,101 | A | | 8/1997 | Hammer | 407/37 |
| 5,716,167 | A | | 2/1998 | Siddle et al. | 407/36 |
| 5,857,506 | A | | 1/1999 | Paolone | 144/230 |
| 5,957,176 | A | | 9/1999 | Stein | 144/230 |
| 6,119,741 | A | | 9/2000 | Rowe et al. | 144/230 |

FOREIGN PATENT DOCUMENTS

| | | |
|---|---|---|
| CH | 682 469 | 9/1993 |
| DE | 31 20 962 | 12/1982 |
| DE | 41 21 289 | 1/1992 |

* cited by examiner

*Primary Examiner*—Henry W. H. Tsai
(74) *Attorney, Agent, or Firm*—Shewchuk IP Services; Jeffrey D. Shewchuk

(57) ABSTRACT

A method for reusing profile insert blades maintains axial, radial and profile dimensions of a cutting tool. The method includes duplicating an original profile on a used profile insert blade by sharpening a profile edge of the used profile insert blade to form a sharpened profile edge with a new profile that is shifted longitudinally along a length of the profile cutter blade relative to an original profile position. Material is removed from a reference edge of the sharpened profile insert blade to form a new reference edge, for positioning the resharpened blade in a longitudinally changed position so that the new adjusted profile has similar axial, radial and profile dimensions as compared to the original profile.

34 Claims, 7 Drawing Sheets

CONSTANT DIMENSION INSERT CUTTING TOOL WITH REGRINDABLE PROFILED INSERTS

BACKGROUND OF THE INVENTION

The invention relates to a cutterhead or router bit, having profiled insert blades or knives, each having a cutting edge for use in cutting a broad range of nonferrous materials. More specifically, the invention relates to a cutterhead or router bit having profiled insert blades or knives that can be sharpened by re-profiling the cutting edge without changing the original profile, the original cutting diameter of the tool in the radial direction, or the original location of the cutting edge (height or thickness) relative to the axis. The present invention relates to a method and apparatus for sharpening inserts through re-profiling to allow reuse of the insert blade while maintaining the original cutting profile and dimensions.

Generally, cutterheads and router bits are rotating cutting tools designed to perform precision cutting on planar or curved surfaces of a workpiece. Insert cutting tools, comprising one design family of cutting tools, utilize removable cutting blades referred to as knives or inserts. Inserts are commonly, but not exclusively, made from relatively small blanks of various grades of carbide, tantung, or high speed steel ceramic and the like. Some inserts have an insert body with an attached, generally brazed, cutting tip material applied, such as mono or poly-crystalline diamond, other types of manufactured diamond and the like, the cutting materials described above, or other similar materials. Typically, any combination of insert designs may be used on the same cutting tool body.

Cut angles used in metal working are generally different from woods, plastics and other nonferrous materials. Wood varies dramatically in density and grain structure within small areas of a board. Wood knots and wood grain variations provide small visible differences in the wood surface, which may have dramatic effects on blade angles and cutting speeds. Additionally, these wood grain differences vary widely between species of wood. The hook, shear, and back clearance angles are chosen according to the hardness, density and grain variation of the material to be cut. Typically, cutters for metals use negative hook angles. Hard woods, such as hard maple, may also use negative hook angles. Generally, woods, plastics and nonferrous metals have a broader range of possible hook angles, of which the angles for metal working is a small subset.

Industries using wood and related materials, such as MDF, plastics and similar non-ferrous materials, almost universally employ insert-type tools for precision cutting of a profile or a design. Typically, within the family of removable insert cutting tools, the cutting edge extends beyond the cutting tool body peripheral surface as the tool with the inserts rotates on a shank or machine shaft. As the cutting edges contact the workpiece, a chip or shaving is removed from the workpiece. When each blade contacts the workpiece, the blade removes a shaving. The thickness of each shaving depends upon the advance rate of the workpiece and the rotational speed of the cutting tool. The surface of the wood or plastic (workpiece) that is being cut is fed against or in the same direction (commonly referred to as "climb" or "convention" cutting) the cutting tool while the tool rotates.

During use, the inserts may wear down or become damaged. Dull and damaged inserts may damage the workpiece. Thus, cutting inserts require frequent inspection, adjustment, and replacement.

Operating costs depend in large part on how long the insert remains sharp and free of damage before it must be replaced. The operating costs of machines which utilize the thin blades are effected by the cost of the blades, the length of downtime intervals which are required to replace a used blade with a fresh blade, the length of downtime interval required to change the orientation of a blade having several cutting edges, the shape and complexity of the cutting surface, the type of material to be cut, and so on. The length of downtime interval required for exchange or reorientation of blades can be reduced by using holders which can be rapidly inserted into or removed from the body portion of the tool. However, such holders typically assume a singular position for the blade relative to the holder, such that a re-sharpened blade would require adjustment of the entire cutterhead.

The cost of inserts can be kept low by using polygonal pieces of cutting material having one or more cutting edges. However, profile cutting blades typically have a single cutting surface with a unique shape, such that the cost of the blades is significantly higher than the stock blades. While multi-edge indexable inserts can be rotated so that when one cutting edge becomes dull an unused cutting edge can be rotated into position, the profiled inserts typically have a single cutting edge (in some cases two opposing cutting edges) with a unique profile shape. The cost of the profiled inserts is significantly higher than ordinary indexable inserts.

Typically, profiled inserts assume a singular position for the insert relative to the tool body such that the re-profiled or re-faced inserts are changed in one or more dimensions relative to the original insert cutting edge. It is presently possible to re-profile open profiles on inserts without changing the profile; however, the cutting diameter and axial position of the profile cutting edge will change relative to the original cutting edge. It is also possible to sharpen an insert cutting edge by face grinding the insert; however, the profile shape, the radial diameter and the axial position of the cutting edge will change. Thus, the profile inserts are typically designed to be disposable, single-use items.

BRIEF SUMMARY OF THE INVENTION

The present invention includes a rotating cutting tool body (cutterhead or router bit) having one or more precision machined pockets or insert slots for receiving a profiled insert or blade. The profiled insert has a top edge, a cutting profile, a reference edge, and a ramp edge, (not always distinct from one another) and is held in place by a wedge and attachment means. The ramp edge of the profiled insert is aligned against a ramp wall of a pocket in the cutting tool body, and the reference edge is aligned with a reference face of the cutting tool body. As the profiled insert becomes dull, the insert is removed and re-profiled, including the removal of blade material along the cutting profile and along the reference edge to establish a new cutting profile and a new reference edge. The re-profiled insert may then be placed into the pocket in the cutting tool body and advanced along the ramp wall of the cutting tool pocket until the new reference edge of the insert is aligned with the reference face of the cutting tool body. Thus located, the cutting tool with re-profiled inserts maintains a constant diameter, constant profile cutting edge, and a constant axial position.

While the above-identified illustrations set forth preferred embodiments, numerous embodiments of the present invention have been designed and contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
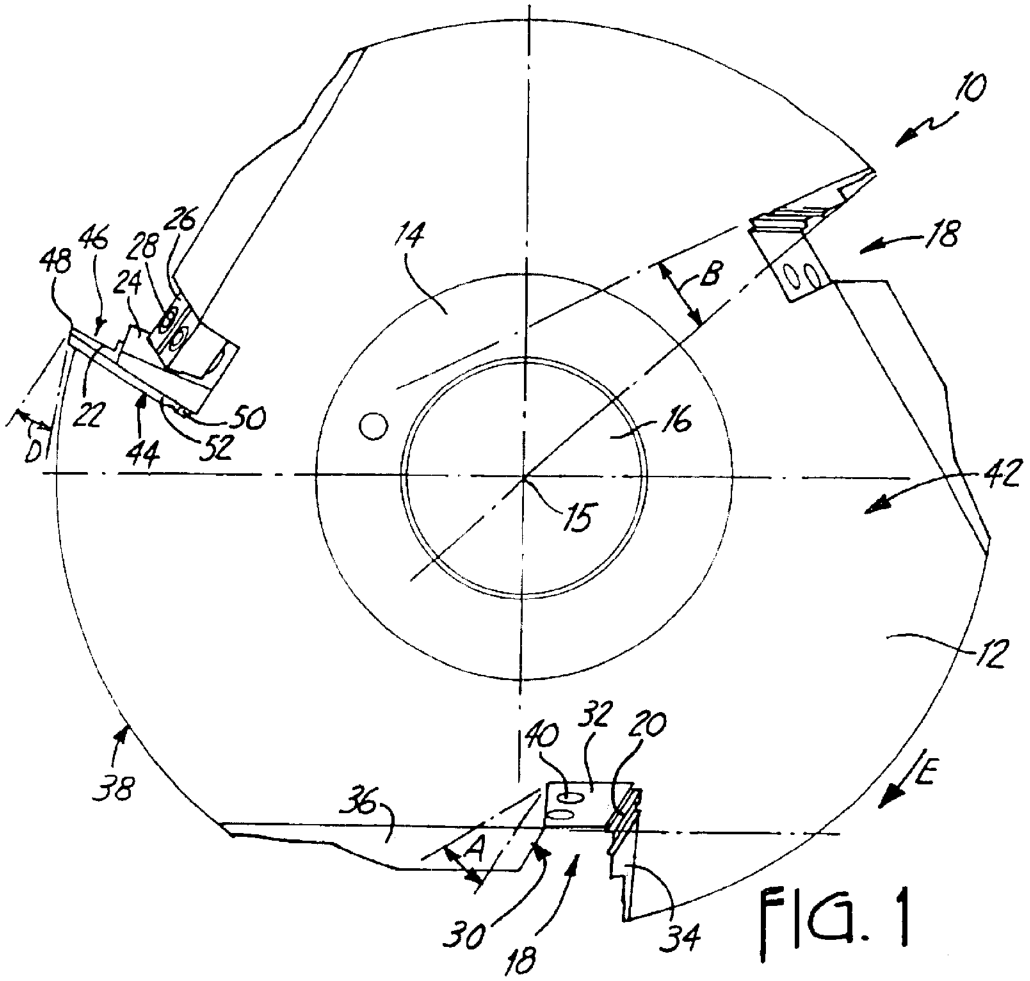
FIG. 1 is a top plan view of a cutterhead of the present invention.

FIG. 1 shows a cutterhead 10 having a substantially circumferential body 12. The body 12 has a shoulder 14 around a bore 16 to fixably mount the cutterhead 10 to a rotating spindle, shank or machine shaft (not shown) in order to cut or shape material. The bore 16 extends through the body 12 along a central axis 15 which extends through the center of mass of the cutting tool. The cutterhead 10 has one or more inserts slots, wings or pockets 18 such as the three circumferentially spaced insert pockets 18 shown. Each insert pocket 18 has a guide mechanism or ridge 20 for guiding an insert 22 into position in the pocket 18. Each insert pocket 18 is sized to receive an insert 22, a wedge 24, clamps 26 and clamping screws 28. During use, the insert 22 extends beyond the peripheral surface of the cutting tool body 12 as the cutting tool 10 rotates so as to contact the workpiece and perform the cut.

Each insert pocket 18 has a leading insert wall 30, a ramp wall 32, and a trailing insert wall 34. An access face 36 extends from the circumferential edge 38 to the insert pocket 18 to expose the insert 22 to a non-ferrous material or workpiece and allow the shavings or chips from the workpiece to be released.

The guide mechanism, such as ridge 20 on the insert ramp wall 32, preferably extends the full length of the pocket 18 of the cutting tool 10 for ensuring proper safety in holding the insert 22 in place. Generally, the insert 22 has a corresponding guide, such as a groove (not shown). The ridge 20/groove relation also provides a safety mechanism for preventing the insert 22 from slipping radially during use. In the preferred embodiment, the ridge 20 is a convex ridge, and the insert 22 has a corresponding concave groove.

The insert pocket 18 has a ramp wall 32, which slants outward away from the bore 14 defining a ramp angle A relative to the central axis 15. The ramp wall 32 has one or more threaded bore holes 40 sized to receive one or more clamping screws 28. The access face 36 preferably extends outward from the supply face 42 to define the same angle A with respective central axis 15, such that both the access face 36 and the ramp wall 32 extend at the ramp angle A relative to the central axis 15. The angle of the access face 36 is not critical. The access face 36 provides clearance for chips and shavings of the workpiece to be released. As shown with respect to the router bit of FIGS. 6–10 (discussed supra), the access area may be curved or cupped, such that the angle varies along the curve of the access area. The access face may be of any shape or configuration, provided an end of the access face 36 exposes the insert 22, because the access face 36 provides clearance for chips and debris.

Generally, the inserts 22 are polygonal pieces of carbide (or materials previous mentioned) having one or more cutting edges. As shown in the present invention, the inserts 22 are unitary pieces flat sheet having a singular cutting edge. However, some blades may be formed from a sheet steel stock tipped with a harder substance, such as mono or poly-crystalline diamond.

Figure 2:
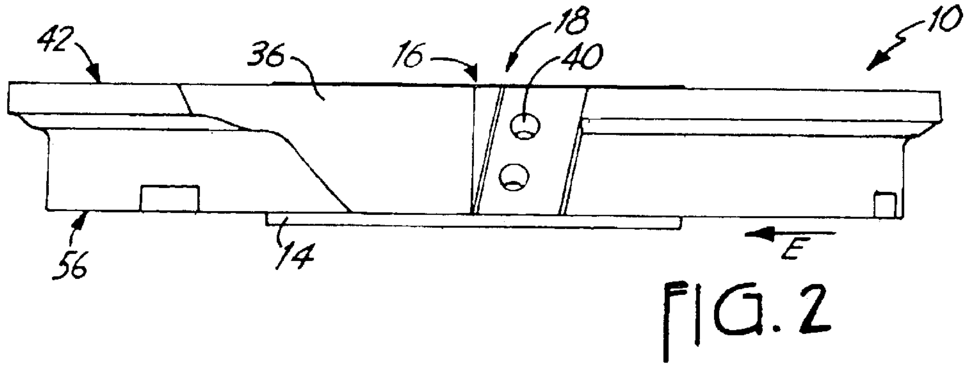
FIG. 2 is a side plan view of the cutterhead of FIG. 1.
Figure 3:
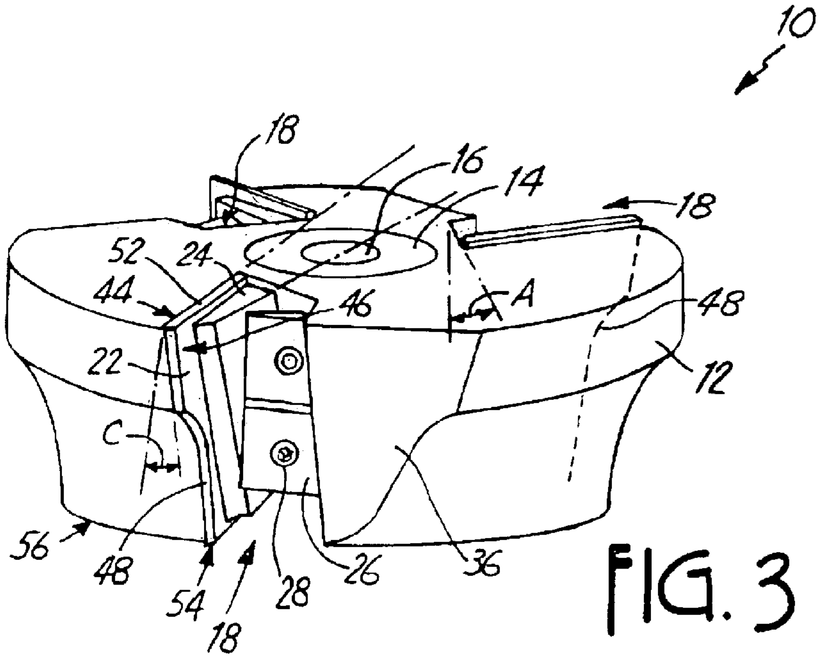
FIG. 3 is a perspective view of a cutterhead of the present invention.
Figure 4:
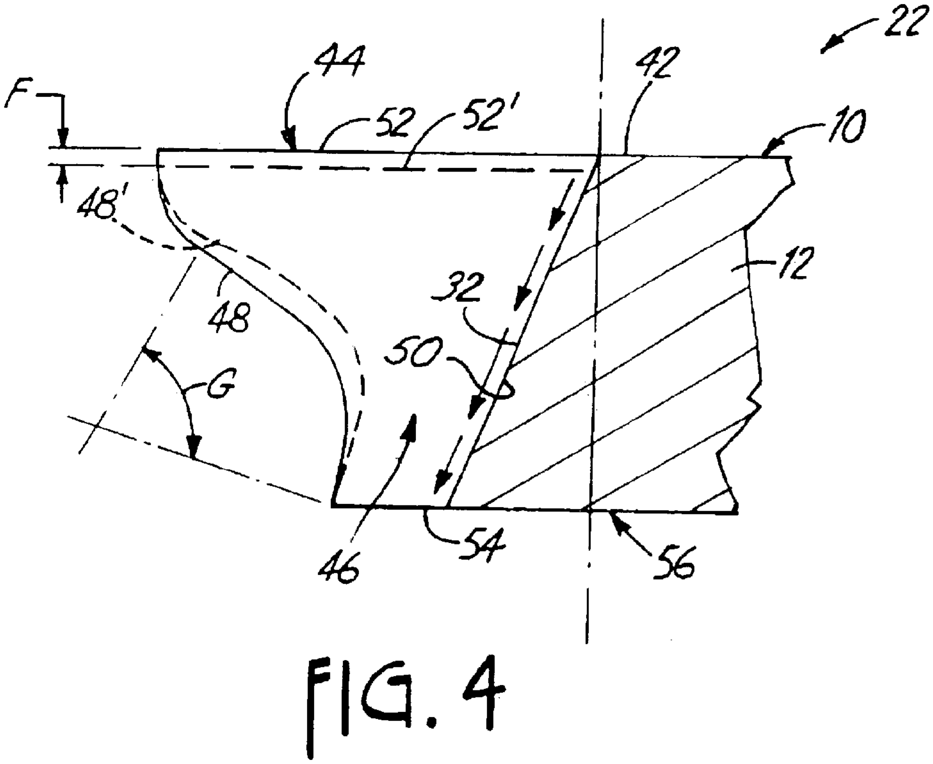
FIG. 4 is a side view of a profile insert in situ with a cross sectional portion of the cutterhead of FIG. 1.

As best shown in FIGS. 3 and 4, the insert 22 has a trailing face 44, a leading face 46, a radial or profile edge 48, a ramp edge 50, a supply edge 52, and a reference edge 54 (shown in FIGS. 3 and 4). The trailing face 44 and the leading face 46 are substantially parallel. The supply edge 52 and the reference edge 54 need not be parallel. The ramp edge 50 mates with the ramp wall 32 of the cutterhead 10. The radial edge 48 defines a profile shape for shaping the workpiece. Generally, the radial edge 48 may define a non-linear cutting edge, though for some purposes the cutting edge may be straight. The reference edge 54 is used to align the cutting insert 22 with the reference face 56 (shown in FIG. 2)

The orientation of the insert 22 in the cutterhead defines four angles: a ramp angle A, a hook angle B, a shear angle C, and a back clearance angle D. As previously mentioned, the ramp angle A is defined as the angle between the ramp wall 32 and the central axis 15. Generally, ramp angle A causes the insert 22 to extend further radially as the insert 22 is advanced axially against the ramp wall 32. Depending on the shape of the profile insert 22 and the size of the cutterhead 10, the ramp angle A may vary between 1 and 89 degrees. A shallow profile on the profile insert 22 requires a small ramp angle A, whereas a deep profile on the insert 22 requires a larger ramp angle A.

The hook angle B is the angle at which the radial edge 48 of the insert 22 attacks the surface the workpiece as determined by the profile edge 48 relationship to the central axis 15 of the cutterhead 10. Generally, the hook angle B is the angle defined by the intersection of a line extending from the central axis 15 to the leading point of the insert 22. In a cross-section perpendicular to the axis 15, the hook angle B is the angle between a line intersecting the cutterhead axis and the cutting tip of the insert 22 and a line along the leading face 46 of the insert 22. Because the circumferential location of the cutting tip of the insert 22 varies along the radial profile edge, the hook angle B of the insert 22 varies along the radial profile edge 48 (radius of cutting point, i.e. cos(C)). In FIG. 1, the hook angle B at the reference edge 54 is roughly 20 degrees. The hook angle B may be varied by machining the cutterhead 10 to have a different angle according to the material to be cut. Generally, the harder the material to be cut, the smaller the hook angle B. Metals and hard maples, for instance, typically require a negative hook angle B.

Generally, the hook angle B varies according to the density or hardness of the material. For hard metals, the hook angle is generally limited to between −5 degrees and 5 degrees. For a small minority of softer metals, the hook angle B varies from −5 degrees to 10 degrees. For non-ferrous metals and woods, the hook angle B typically ranges from −5 degrees to 60 degrees.

Figure 5:
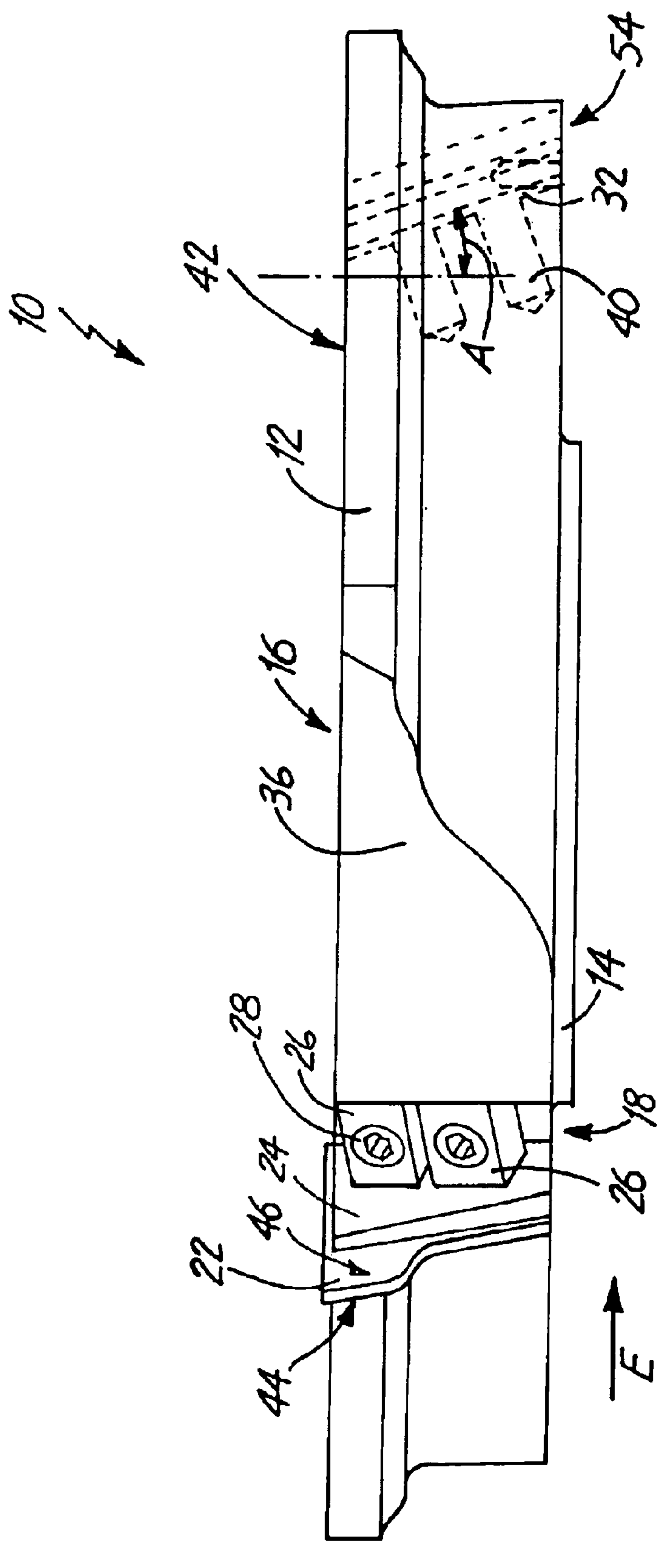
FIG. 5 is a schematic side view of a cutterhead of the present invention.

The shear angle C and back clearance angle D are more clearly visible in FIGS. 3–5. The shear angle C is defined by the intersection of a line parallel to the central axis 15 with the leading face 46 of the insert 22. During each rotation of the cutterhead 10, the insert blades 22 contact the workpiece at a single point, which moves during the cut, away from the supply edge 52 and toward the reference edge 54. Each time the insert 22 rotates through the workpiece, a small chip is sliced away from the workpiece surface. The shear angle C ensures that only a single point along the profile edge 48 of the insert 22 is cutting the workpiece at any given instant.

The back clearance angle D is the angle at which the 44 profile edge 48 of the cutting insert 22 recedes from the furthest radially extending point of the leading face 46 of the cutting insert 22. Said another way, the back clearance angle D is defined by a tangent line extending from the cutting point of the profiled insert 22 relative to the surface of the profile edge 48 of the cutting insert 22. The sharpness or bluntness of the cutting insert 22 is determined by this back clearance angle D, which is created by removing metal from the trailing edge of the cutting insert 22 during grinding. The clearance angle D prevents the insert 22 from causing the workpiece to burn. Generally, for metals, a clearance angle D is in the range of 5–7 degrees. For nonferrous metals and woods, generally the clearance angle D may range from 5 to 15 degrees.

The access faces 36, which provide chip clearance for chips and shavings from a workpiece, also exposes the leading face 46 of the cutting insert 22 to the workpiece when the cutterhead 10 is rotated in the direction E. The wedge 24 and clamps 26 exert lateral force against the leading face 46 of the insert 22 to prevent unwanted motion of the insert 22 during use. The clamping screws 28 fix the clamps 26 and the wedge 24 into place next to the insert 22 within the insert pocket 18. Generally, the clamping screws 28 may be any device for releasably attaching the clamps 26 and wedge 24 into place. In the preferred embodiment, the clamping screws 28 are hex screws which insert through the clamps 26 and into threaded holes 40 in the insert pockets 18 on the body 12 of the cutterhead 10. The holes 40 in the insert pocket 18 are sized to receive a threaded clamping screw 28 and extend into the body 12 perpendicular to the surface of the ramp wall 32. Tightening the clamping screws 28 exerts a horizontal force on the wedge 24, which in turn exerts a horizontal force on the insert 22. Thus, the insert 22 is held in place during use by the horizontal force and an opposing normal force exerted on the insert 22 by the trailing wall 34 of the insert pocket 18.

The cutterhead 10 described herein, is primarily designed for use with non-ferrous materials, such as plastics, woods, and non-ferrous metals. Wood varies dramatically in density and grain structure within small areas of a board. Wood knots and wood grain variations provide small visible differences in the wood surface, which may have dramatic effects on insert angles and cutting speeds. Additionally, these wood grain differences vary widely between species of wood. The hook, shear, and back clearance angles are chosen according to the hardness, density and grain variation of the material to be cut. Typically, cutters for metals use negative hook angles. Hard woods, such as hard maple, may also use negative hook angles.

The hook angle B and the shear angle C work together so that only a single point along the insert 22 is actually cutting at any given time. By advancing a board tangentially to the rotating cutterhead 10, the insert 22 contacts the workpiece at a single point, which moves along the profile of the insert 22 as the cutterhead 10 proceeds through its rotation. The shear angle C causes the bottom of the insert 22 to contact the workpiece first.

The notch 20 within the insert pocket 18 on the cutterhead 10 extends from the supply face 42 to the reference face 56 along the trailing wall 34. The notch 20 corresponds with a groove (not shown) on the insert 22. The notch 20 is sized to fit the groove. The notch 20 mates with the groove to ensure a proper insertion of the blade into the pocket 18 of the cutterhead 10.

As shown in FIG. 2, the cutterhead 10 has a supply face 42 and a reference face 56. The access face 36 exposes the leading face 46 of the insert 22 when the cutterhead 10 is rotated in the direction E. The cutterhead 10 has an insert pocket 18 having a ramp wall 32 and a trailing insert pocket wall 34, which defines one side wall of the insert pocket 18. The trailing insert pocket wall 34 provides a support surface for the trailing face 44 of the cutting insert 22. The ramp edge 50 of the cutting insert 22 contacts the back wall 32 of the insert pocket 18 which extends away from the central axis 15 of the cutterhead 10 as the back wall 32 extends from the supply face 42 to the reference face 56.

When an insert 22 is inserted into the insert pocket 18 such that the ramp edge 50 contacts the ramp wall 32, the insert 22 is advanced axially and radially along the ramp wall 32 from the supply face 42 toward the reference face 56 until the reference edge 54 of the cutting insert 22 and the reference face 56 of the cutterhead 10 are aligned. The ramp angle A of the ramp wall 32 causes the insert 22 to advance simultaneously both in the axial and in the radial direction. Then the wedge 24, the clamps 26, and the clamping screws 28 are inserted into the insert pocket 18 to hold the insert 22 in place.

As shown in FIG. 3, the body 12 of the cutterhead 10 has a ring portion that is generally referred to as a shoulder 14 around the bore 16. The shoulder 14 is raised slightly above the supply face 42 of the cutterhead 10. Additionally, the shoulder 14 extends outward from the supply face 42 to the reference face 56 such that the shoulder is raised slightly above the reference face 56 of the cutterhead 10. The shoulder 14 provides a surface for grinding, if required, to true or level the cutting tool path. In certain instances, it may be necessary to modify the cutting tool 10 to serve a particular function. Since the cutting tool 10 is typically customized for the particular application, parts of the cutting tool 10 may need to be adjusted prior to use by either the end user or the manufacturer. The shoulder 14 provides such a surface.

As shown in FIG. 3, the back wall of the insert pocket 18 defines a ramp angle A relative to the central axis 15 of the cutterhead 10. The insert 22 advances axially from the supply face 42 to the reference face 56 along the ramp wall 32. The ramp edge 50 of the insert 22 mates with the ramp wall 32 of the cutterhead 10 when the insert 22 is properly inserted into the cutterhead 10.

As shown in FIG. 4 the insert 22 has a supply edge 52, a profile or radial edge 48, a reference edge 54, and a ramp edge 50. The ramp edge 50 mates with the back ramp wall 32 of the insert pocket 18 on the cutterhead 10. The ramp wall 32 of the cutterhead 10 defines an angle A relative to this central axis 15 of the cutterhead 10. The insert 22 is advanced axially and radially along the ramp edge 50 (as shown by arrows E) until the reference edge 54 of the insert 22 is aligned with the reference face 56 of the cutterhead 10.

During use, the profile edge 48 of the profile insert 22 gradually becomes dull, and breaks or small cracks may be found along the profile edge 48 due to wear. In such cases, the insert 22 must be replaced or reprofiled. With respect to extant cutting blades 22, the most cost effective means is simply replace the insert 22 with an identically dimensioned and profiled commercially available insert 22. However, profiled insert blades significantly more expensive than standard multi-edge insert blades. It is expensive to discard and replace worn profiled insert blades 22. It is desirable therefore to regrind and resize the cutting insert 22 for reuse.

In the present invention, the insert 22 is removed, and the profile edge 48 is reprofiled to define a new profile edge 48. Then, a small portion of material is removed along the reference edge 54 defining a new reference edge 54. Finally, the reprofiled insert 22 may be inserted into the cutterhead 10 such that the ramp edge 50 of the insert 22 mates with the ramp wall 32 of the cutterhead 10. By removing material from the reference edge 54, the profile edge 48 of the blade is shifted perpendicular to the reference edge 54.

The reprofiled insert 22 is then advanced axially and radially along the ramp edge 50 until the new reference edge 54 is aligned with the reference face 56 of the cutterhead 10. Similarly, the supply edge 52 descends into the insert pocket 18. The insert 22 is advanced a distance F, the distance between supply edge 52 and new supply edge 52', which equals the amount of material removed from the reference edge 54 of the insert 22 to establish a new reference edge 54'. The ramp wall 32 forces the new profile edge 48' outward radially, causing the sharpened profiled insert 22 to present the same cutting diameter, the same axial dimension and the identical profile as the original profiled insert 22.

Thus, the profile insert 22 may be reprofiled and reinserted into the cutterhead 10, aligned along the reference edge 54' and fixed into place using the wedge 24, clamps 26 and clamping screws 28 to provide a sharpened insert 22 having the same cutting diameter, axial location and profile as the original insert 22. No adjustment of the cutterhead 10 axially or radially is required to maintain the same cutting diameter and cutting profile. Thus, work time and money is saved by reprofiling and reusing these insert blades 22 with the cutterhead 10 of the present invention. By removing material along the reference edge 54 of the insert 22 to provide a new reference edge 54', the new reference edge 54' may be aligned with the reference face 56 of the cutterhead 10 to account for material removed from the profile edge 48 during the reprofiling process, so that the insert 22 may be reused numerous times.

Prior to the present invention, sharpening of an insert 22 caused considerable down time and material waste as end users would insert the resharpened insert 22 and begin testing and adjusting the cutterhead 10 until the desired cut was achieved. Even after testing and adjustment, the prior art cutting tools 10 could not repeat the original dimensions. Sharpening can be performed by face grinding or by cutting a new profile edge. Cutting a new profile edge can be accomplished by regrinding or by some other means. Typical face grinding to sharpen a dull blade alters the profile so that a workpiece made after the reprofiling are different from those made with the original insert 22. The same is true if the profile insert is reprofiled and reused in a standard cutting tool 10.

Generally, sharpening can be achieved in a number of ways. In the preferred embodiment, sharpening is performed by cutting a new profile edge (reprofiling) as opposed to face grinding. Reprofiling a new profile edge can be done by regrinding (such as with a CNC grinder) or by cutting on an EDM (Electrical Discharge Machine), or by some other means.

In the present invention, the sharpened insert 22 may be simply reinserted and used without adjustment of the cutterhead 10. Thus, material waste is reduced or eliminated, measuring and adjustment time by the end user is eliminated, and the life of a profile insert 22 is extended. Generally, a profile insert 22 may be sharpened until the supply edge 52 of the insert 22 extends beyond the top edge of the clamp 26 that is furthest from the reference edge 54. While it may be possible to sharpen the insert 22 further, the clamp 26 provides a visual line by which to determine the life of the insert 22.

In FIG. 5, the cutterhead 10 is shown in schematic profile. The angle A of the ramp wall pushes against the ramp edge 50 of the insert 22 such that the sharpened profile 48 of the insert 22 extends further radially as it is advanced axially against the ramp wall 32.

The rotating cutterhead 10 causes the inserts 22 to thrust into and lift a series of chips from the surface of the workpiece. The depth and width of the marks left on the surface of the workpiece are determined by the diameter of the cutterhead 10, its rotational speed, and the speed of the workpiece being fed under it. The quality and/or smoothness of the surface of the chips or cuts is determined by the back clearance angle D and the hook angle B of the head. Like all woodworking cutting tools, the design of the present invention can be manufactured with any combination of hooks, shears, and clearance angles to be used in cutting the full range of materials.

The most common problem associated with the hook angle D of a cutterhead 10 is tear out. Certain species of wood like cherry, hard maple, alder, fir, African mahogany, and others have a weak bond between the growth rings in the tree. As the workpiece moves along under the blades 22 in a profile cutter 10, the structures in the workpiece present themselves in ever-changing orientation to the insert 22. Tear out occurs when the insert 22 begins its upward motion to exit the workpiece, taking a chip with it. The force of the insert 22 lifting the chip causes the workpiece to fracture along grain lines, tearing below the surface of the furthest point of the blade, leaving a hole with one torn and ragged edge. Deep cuts exacerbate this problem.

Sharpening the blades 22 with a higher back clearance angle D results in a sharper insert 22, which will sever the chip with less upwards stress on the workpiece and minimize the tear out. However, the sharper the insert 22 the shorter the insert 22 life or durability of the insert 22. Especially on hard species of wood, a high back clearance angle D may not be an option for an extended run. Slowing down the feed speed of the machine results in a thinner chip, reducing the force of the tip of the insert 22 on the workpiece. Running the cutter head 10 slower; however, may cause the insert 22 to dull faster. Another option is to increase the number of blades 22 in the cutterhead 10. Increasing the number of blades 22 reduces the size of chips and minimizes the tear out; however, for custom profile work, the cost of the profiled inserts 22 generally makes this option too expensive.

As shown in FIGS. 1–5, the insert 22 defines a third angle relative to the central axis 15 of the cutterhead 10, the shear angle C. The shear angle C causes the insert 22 to be ramped such that the profile edge 48 only contacts the workpiece at a single point at any given moment. The portion of the cutting insert 22 closest to the reference edge 54 of the cutterhead 10 leads the rest of the insert 22 into the cut, beginning each new cut. The shear angle C of the blade guarantees that only one point along the insert 22 will be cutting the workpiece at any given time or instant of use. Thus, the stress on the insert 22 is reduced, thereby extending the life of the insert cutter insert 22. As the insert blade 22 rotates, the insert blade 22 begins a chip, which extends as the cutterhead 10 rotates until the depth of the cutting profile 48 is reached.

The cutting profile 48 of the cutter insert 22 also defines an angle G relative to the curve of the profile. The amount of material moved from the bottom edge of the cutting insert 22 during regrind is a function of the depth of the profile regrind, the size of the angle G and the back clearance angle D of the insert 22.

Generally, the design and angles of a cutterhead 10 are determined by the cutterhead 10 velocity, the feed of the workpiece per tooth cut, and the workpiece type. The hook angle B of the cutterhead 10 varies from roughly minus 10 degrees to a positive 35 degree angle relative to the central axis 15. The hook angle B is defined by extending a line from the central axis 15 of the cutterhead 10 to the profile edge 48 of the profiled insert 22. The angle between the imaginary line from the central axis 14 to the cutting point and the surface of the cutting insert 22 defines the hook angle B. Hard materials such as hard maple woods and metals typically are cut using a negative hook angle B. Softer woods can be cut with angles that extend almost to a positive 35 degrees. Thus, the hook angle B is largely dependent on the material to be cut.

The ramp angle A along which the ramp wall 32 of the insert pocket 18 varies anywhere from 1 degree to 89 degrees from the central axis 15. The ramp wall 32 may form either a positive or a negative angle within that range relative to the central axis 15. The angle A of the ramp wall 32 is largely dependent upon the variation depths of the profile edge 48 of the insert cutter insert 22. For a largely flat profile cutting insert 22, the angle will typically be larger. For more deep profile cutting blades 22, the ramp angle A extends approximately 20 degrees. The angle of the ramp edge 50 allows the reprofiled cutter insert 22 to be advanced axially and radially along the ramp edge 50 so that the new profile edge 48 defined by the regrind process is positioned relative to the cutterhead 10 so as to maintain a constant cutting diameter and cutting profile consistent with the original cutting insert 22.

The shear angle C is defined by a vertical plane extending from the central axis 15 of the cutterhead 10 to the bottom reference edge 54 of the cutter insert 22. The angle C of the cutting profile 48 of the cutter insert 22 relative to the vertical plane defines the shear angle C. The shear angle C and the back clearance angle D combine to determine the depth of each individual cut.

The cutter insert 22 generally does not extend beyond the supply face 42 of the cutterhead 10 for safety reasons. With each sharpening of the insert 22, the insert 22 is advanced along the ramp edge 50 toward the reference face 56 so that the supply edge 52 of the insert 22 descends into the insert pocket 18 below the supply face 42 of the cutterhead 10. The limit on sharpening of the insert 22 is defined so as to assist an end user in determining when to discard the sharpened insert 22 instead of reprofiling it. Specifically, when the supply edge 52 of the sharpened insert 22 reaches the top edge of the upper clamp 26, the sharpened insert 22 should not be sharpened further. The top edge of the upper clamp 26 provides a visible marker or visible indicator for determining when to stop attempting to reprofile the insert 22.

Generally, each workpiece or cutting material has a "velocity sweet spot" which is the optimum rotational speed for cutting the material. Within the range of speeds that define the sweet spot, the cutting insert 22 enjoys its longest cutting life. Additionally, the efficiency of the cutting insert 22 and the cutterhead 10 is maximized.

As previously described, in the prior art, with sharpened insert blades, some or all of the critical cutting diameter, the axial dimension, or the profile shape of the insert blade change during face sharpening or reprofiling. Thus, reuse of the sharpened blade by the end user requires significant user time in manually adjusting the cutterhead relative to the workpiece. In addition, all three original dimensions will not be possible In the present invention, sharpened insert blades 22 may be reinserted into the cutterhead 10 and advanced axially and radially along the ramp edge 50 until the reference edge 54 of the insert cutter insert 22 is aligned with the reference face 56 of the cutterhead 10. If the insert cutter insert 22 is aligned with the reference face 56 of the cutterhead 10, the cutting profile, the diameter and the axial position are identical to the original specification. Thus, the end user can simply insert the sharpened insert blades 22, advance it along the ramp edge 50 until it is aligned with the reference face 56, and clamp it into position and begin using it without any manual adjustments or comparisons. In addition, the new or reprofiled insert blades 22 are easy to use and the only tool required to remove and reinsert an insert 22 is a simple hex key. Thus, down time and adjustment time is minimized so that the inherent inefficiencies in manual adjustments of the system are practically eliminated.

The access face 36 need not be straight as shown in FIG. 1. The access face can be curved or of any shape provided the access face is large enough to provide clearance for chips during cutting. Additionally, the position of the insert 22 relative to the wedge 24 and clamps 26 can be altered. Specifically, the wedge 24 and clamps 26 may be placed on the opposite side of the insert 22, such that the wedge 24 and clamps 26 trail the insert 22 during the cutting rotation. The wedge 24 should still be placed directly adjacent the insert 22 to provide support. This alternative embodiment is desirable when debris (i.e. chips, sap, glue, and so on) from the cutting material is a problem in and around the wedge 24, clamps 26, and clamping screws 28.

In an alternative embodiment, the notch 20 maybe provided on the wedge 24, such that the insert 22 mates with the wedge 24. Thus, the notch/groove relationship may be formed with either the wedge 24 or the insert pocket 18 (as depicted).

The present invention may also be applied to numerous different designs of cutting tools 10, where the insert 22 may be reprofiled and inserted with a minimum of end user adjustment and maintenance of all critical dimensions. FIGS. 6–10 present the invention applied to a router bit 60.

Figure 6:
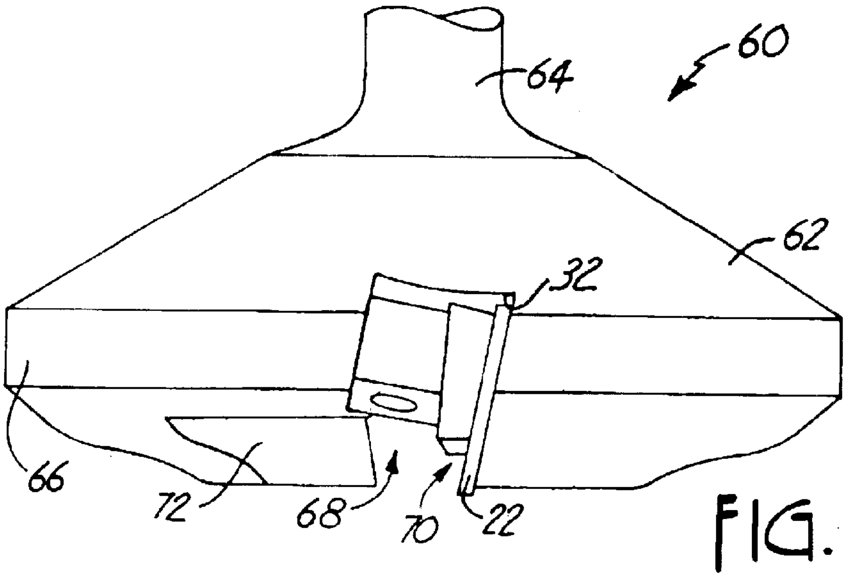
FIG. 6 is a schematic side view of a router bit according to the present invention.

As shown in FIG. 6, the router bit 60 has a body 62 with a shank 64. The router bit 60 uses insert blades 22 like those used in the cutterhead 10 of FIGS. 1–5. The difference between the cutting tool 10 with bore of FIGS. 1–5 and the router bit 60 with shank of FIGS. 6–10 involves the type of machine in which the cutting tool 10 can be used. Specifically, the cutterhead 10 of FIGS. 1–5 typically is used on a machine with a shaft or spindle that is extending through the bore. The router bit 60 of FIGS. 6–10 typically is attached to a machine by inserting the shank into shaft collet (not shown).

As shown in FIG. 6, the router bit 60 has a body 62 with a shank 64. The router bit 60 has a circumferential alignment edge 66 and supply area 68. The router bit 60 defines insert pockets 70 sized to receive insert cutter blades 22, a wedge 24, clamps 26, and clamping screws 28. The profiled insert 22 is held in place by the wedge 24, clamps 26, and clamping screws 28 similar to the cutterhead 10 of FIGS. 1–5.

The ramp wall 32 of the insert pocket 70 extends from the supply area 68 to the reference edge 66 at a ramp angle A of approximately 70 degrees relative to the central axis 15 of the router bit 60. As with the cutterhead 10, the ramp wall 32 forces the radial edge 48 of the insert 22 toward the workpiece. The hook angle B is again shown, as is the shear angle C previously described.

The router bit 60 allows the end user to remove, sharpen and reuse the profile insert blades 22. As with the insert 22 shown in FIG. 4, material is removed from the reference edge 54 of the insert 22, establishing a new reference edge 54. The insert 22 is then advanced from the supply area 68 along the ramp wall 32 until the new reference edge 54 is aligned with the circumferential reference face 66 of the router bit 60. Thus, the profile, cutting diameter, and axial dimension of the router bit 60 can be maintained through multiple sharpenings and with no further manual or mechanical adjustment to the cutting tool body.

Figure 7:
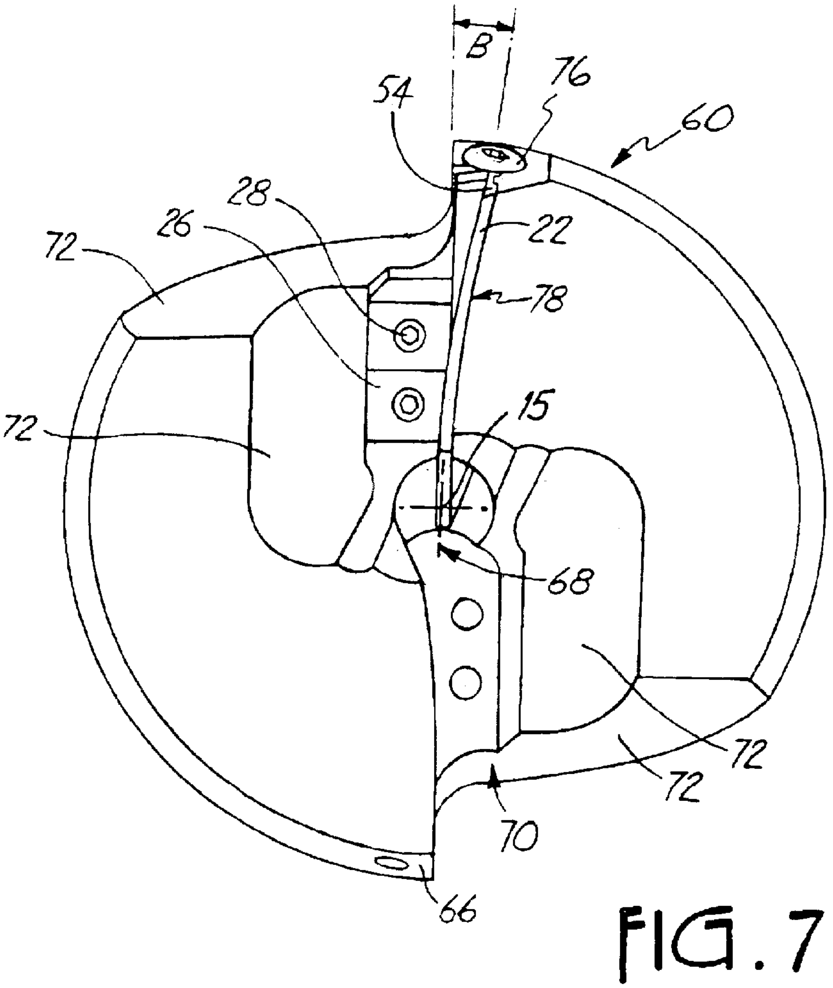
FIG. 7 is a schematic bottom view of the router bit of FIG. 6.

As shown in FIG. 7, the router bit 60 has a wedge 24, clamps 26 and clamp screws 28 to hold the profile insert 22 in place. The profile insert 22 extends at a hook angle B relative to an axis normal to the central axis 15. Cutaways 72 provide access to the insert 22. The cutaways 72 may be curved or straight. As shown, the cutaways 72 intersect the circumferential reference edge 66 of the router bit 60. A scalloped or cupped cutaway 72' extends from the cutaway 72 toward the central axis 15 of the router bit. The scalloped cutaways 72' provide additional space for chips and debris to fall way from the cutting edge. In the embodiment shown, a hex screw 76 is employed to align the reference edge 54 of the insert 22 with the reference face 66 of the router bit 60. The alignment may also be performed with other fastening means or with a removable magnet or other test surface, provided the alignment means does not interfere with the performance of the cutting blade.

Figure 8:
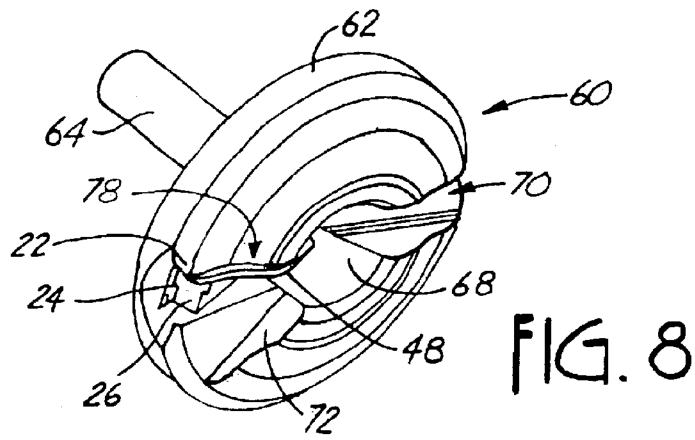
FIG. 8 is a perspective view of the router bit of FIG. 6.

As shown in FIG. 8, the router bit body 62 has cutaways 72 similar to those shown with respect to FIG. 1. The cutaways 72 provide proper release of chips or shavings from the workpiece. A trailing wall 78 of the insert pocket 70 reinforces the profiled insert 22 during use. The ramp edge 50 of the insert cutter insert 22 rests against the ramp wall 32 of the insert pocket 70, and the trailing face of the cutter insert 22 rests against the trailing wall 78 of the insert pocket 70. The back wall provides support for the insert 22. The wedge 24, clamps 26 and clamping screws 28 hold the insert 22 in place so that it does not move during use.

Figure 9:
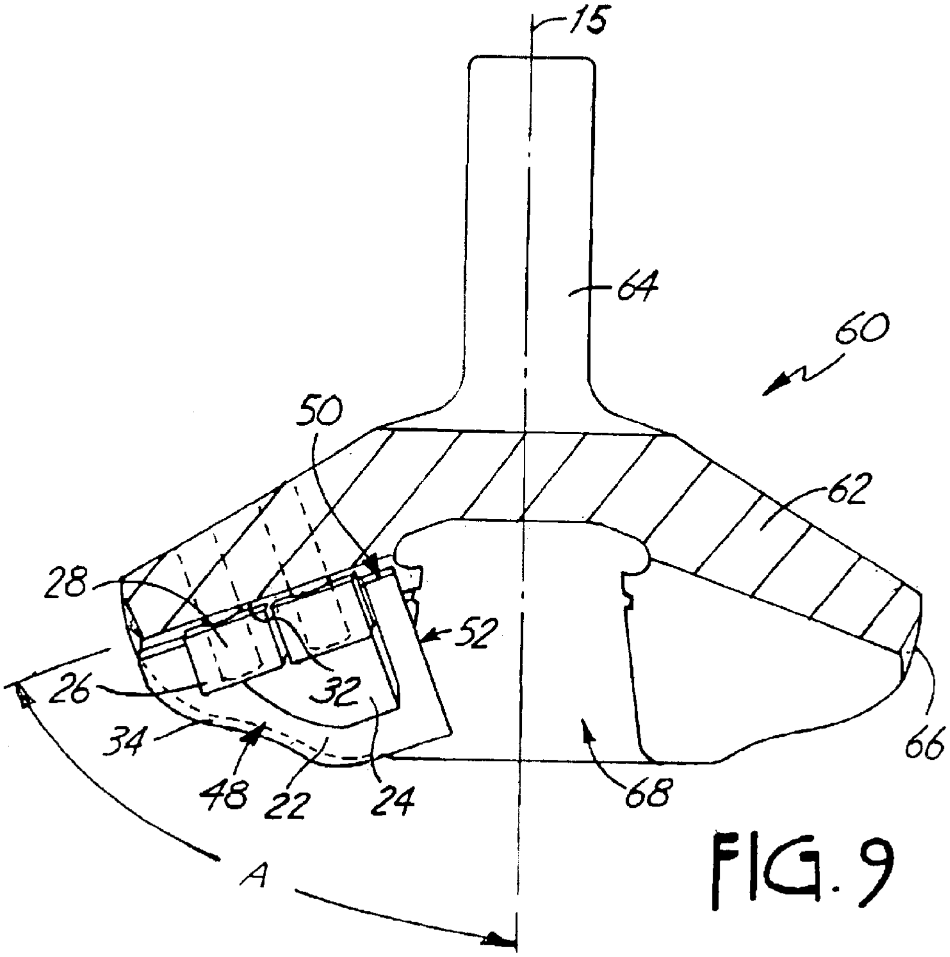
FIG. 9 is a schematic side view of the router bit of FIG. 6.

As shown in FIG. 9, the ramp angle A allows the reprofiled cutter insert 22 to be advanced from the central axis 15 toward the outer circumferential reference edge 54 after reprofiling in order to maintain a constant cutting profile and cutting diameter and axial position relative to the original insert blade 22. Thus, between the original insert 22 and the reprofiled insert 22, there is no difference in cutting diameter, cutting profile, or axial dimensions. Additionally, the end user simply advances the reprofiled insert 22 toward the circumferential reference face 66 until the reference edge 54 is aligned. The user then clamps the insert 22 into place. No additional measurement or adjustment is required by the end user.

Figure 10:
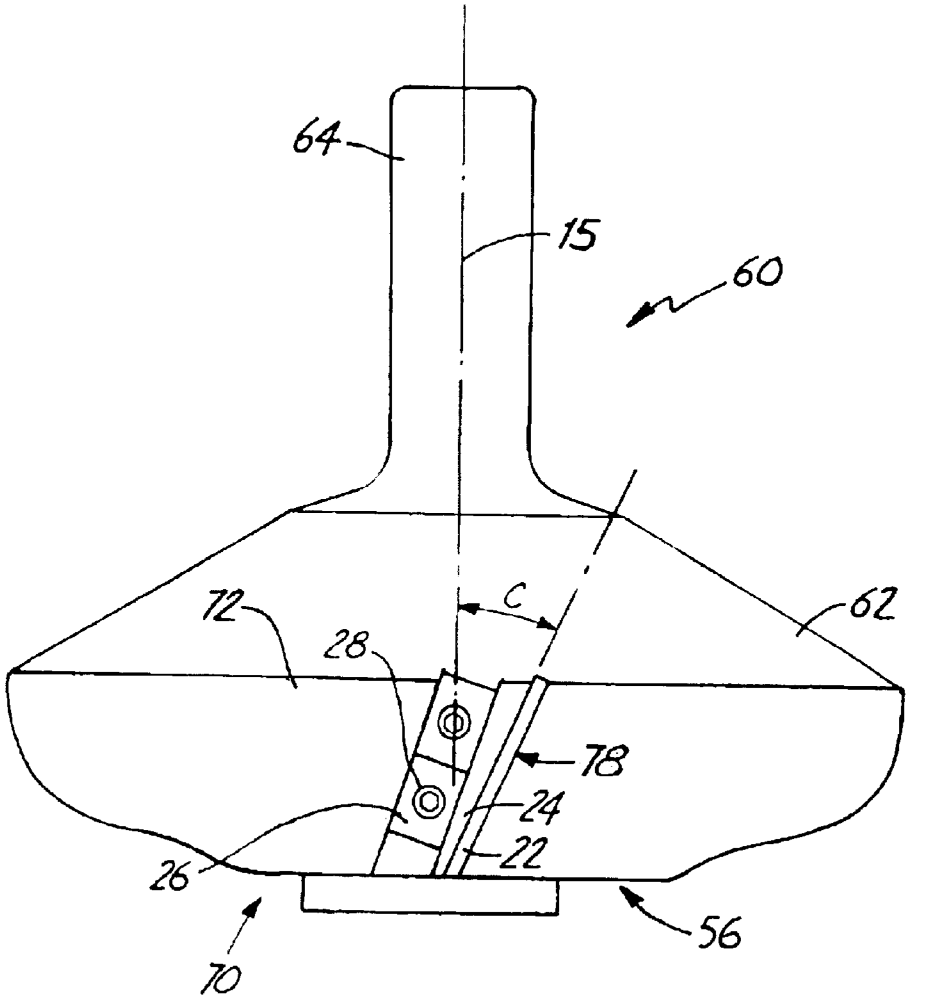
FIG. 10 is a side plan view of the router bit of FIG. 6.

As shown in FIG. 10, the insert 22 defines a shear angle C relative to the central axis 15. The shear angle C is determined according to the material to be cut and the board speed and cut depth desired by the end user. Each cutterhead 10 or router bit 60 may be custom built according to the application. Generally, the desired profile determines the ramp angle A of the insert pocket 70. A flat profile shape requires a smaller ramp angle A than a deeper cutting profile. Simply put, the advancing of the insert 22 along the ramp wall 32 pushes the new profile edge 48 toward the reference edge as the insert 22 is advanced along the ramp edge 50. A flat cutting profile does not require as much of a ramp angle A to extend the insert 22 outward as a deeper cutting profile requires. In order to prevent the additional unused material from making contact with the workpiece, the ramp angle must allow the profiled insert to recede into the cutterhead 10 or router bit 60 so as to hide or protect the end user and the workpiece from the unused portion of the insert 22. With each reprofiling, more of the unused portion of the insert 22 is brought into use, and material at the reference edge 54 of the insert 22 is removed so that most of the cutting insert 22 will ultimately be used. As with the cutterhead 10 described with respect to FIGS. 1–5, the insert blades 22 for the router bit 60 shown in FIG. 10 may be reused until the supply edge 52 of the reference insert 22 reaches the edge of the first clamp 26.

While the insert 22 may be advanced further than the edge of the first clamp 26, the edge of the clamp 26 provides a visible means by which to measure the expiration of a reusable insert 22. Advancing beyond that point exposes the insert 22 and the wedge 24/clamp 26 assembly to risk because it reduces the amount of force holding the insert 22 in position.

Reprofiling (or sharpening) the inserts 22 as shown in the present invention combined with the ramp angle A allows the reprofiled insert 22 to duplicate the precise profile, axial and radial dimensions as the original. When reinserted into the cutterhead 10, the reprofiled insert 22 is simply advanced along the ramp edge 52 until the newly defined reference edge 54 reaches the reference face 56 of the cutterhead 10 or the circumferential reference edge 66. Once the reprofiled insert 22 is advanced to align with the reference face 56, the insert 22 is clamped into place and the insert 22 is ready to be used. The resulting profile tool diameter and axial position of the reprofiled insert blades 22 within the cutterhead 10 are identical to the original. No manual or measured adjustments are required, and work can proceed immediately. Thus, downtime and manual adjustment time are minimized.

Profiled inserts 22 are typically more expensive than standard multi-edge indexable type inserts. To date, profiled inserts are designed to be thrown out and replaced with new inserts. The reprofiled/sharpened insert alternative presented here minimizes downtime and allows for multiple uses of the same insert 22 so that the profiled inserts 22 are more cost effective and the whole process of removal, reprofiling, reinsertion and use of the reprofiled cutter blades 22 is made more efficient. Reprofiling may save as much as 50% as compared to a new profiled insert 22, for the user.

In the preferred embodiment, the trailing wall of the insert pocket 18 is machined with either a ridge or similar locating means 20 extending from the supply face 42 to the reference face 56 of the cutterhead 10 (or the supply area 68 to the circumferential reference edge 66 of the router bit 60), parallel to the ramp wall 32. A corresponding groove on the insert 22 is sized to fit the ridge 20 of the insert pocket 18. The groove on the insert 22 mates with the ridge 20 on the trailing wall face of the insert pocket 18 so as to ensure proper insertion of the insert blade into the cutterhead 10 or router bit 60. When the wedge 24, clamps 26, and clamping screws 28 are in place, the ridge/groove relationship provides additional locking means and support for the insert blade. As previously discussed, in an alternative embodiment, either 20 may be provided on the wedge 24.

Figure 11:
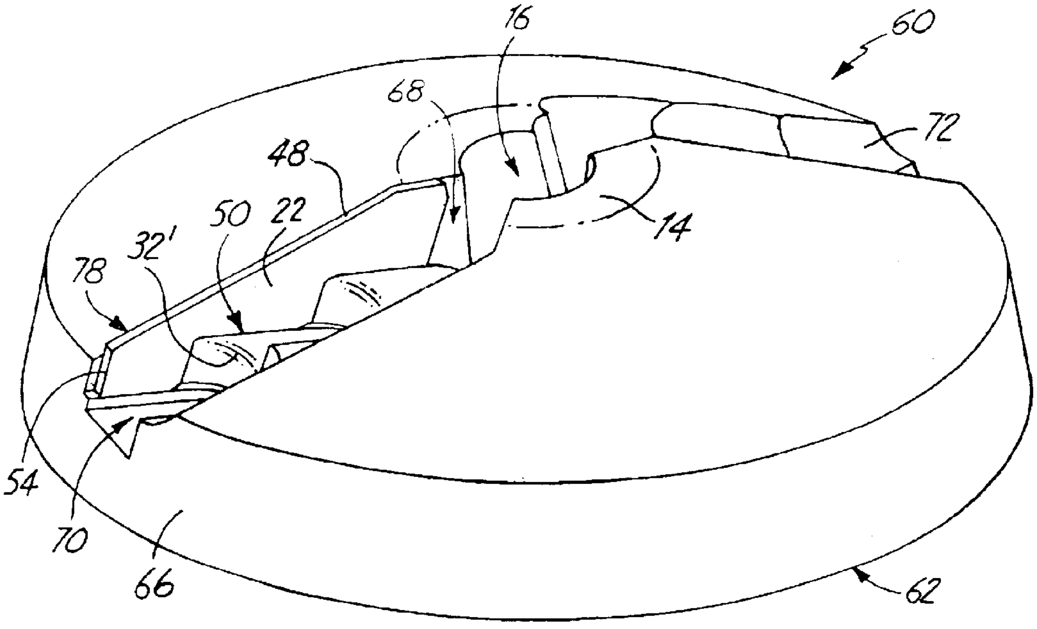
FIG. 11 is a side plan view of a stepped-edge insert.

As shown in FIG. 11, the amount of material used in the insert 22 may be reduced by providing a stepped ramp 32 in the cutting tool 60. The insert 22 can then be cut with a corresponding step on its ramp edge 50. By maintaining a constant depth of the steps on the stepped ramp edge 50 of the insert 22, the ramp edge 50 is in contact with the stepped ramp 32 and the stepped ramp 32 serves the same purpose as the angled ramp 32, namely to push the profile cutting edge 48 outward as the resharpened blade is advanced toward the reference face 66 of the router bit 60. In the cutting tool 10 shown in FIGS. 1–5, the stepped ramp 32 may also be used. The stepped ramp 32 permits a smaller body 12, 62 because the stepped ramp 32 does not need to extend as deeply into the body 12, 62 as the angled ramp wall 32. Furthermore, the stepped ramp 32 permits a smaller insert blade. In this embodiment, the wedge (not shown) may also be stepped to mate with the stepped ramp 32.

The cutaways 72 need not be flat. As shown in FIG. 11, the cutaways 72 may be scalloped or curved. The shape and depth of the cutaways 72 in the router bit 60 and the access face 36 of the cutterhead 10 may vary according to the cutting material. Nevertheless, the access face 36 or cutaways 72 allow space for wood chips and debris to fall away from the insert blade 22 during use.

In another embodiment, the insert is comprised of a structure where the cutting material is secured to another material, forming a carrier or insert body having an attached cutting tip. This is commonly used with brittle cutting material such as mono or poly-crystalline diamond.

In the present invention, the reprofiled blades 22 have the same axial dimensions, the same cutting diameter, and the identical profile as the original insert blade, with an error margin of less than 1.5 mils. Each profile insert 22 may be reprofiled multiple times, and the same insert 22 maybe resharpened and reused until the supply edge 52 of the insert 22 reaches the top of the clamp 26.

The insert blades 22 of the present invention generally are in the range of 2 mm to 2.5 mm thick. However, the invention will work with polycrystalline diamond-edged blades up to 0.2 inches thick. Such diamond edged blades may be used for extremely hard woods and for man-made materials, such as high glue, high abrasive materials.

In the preferred embodiment, flat surfaced magnets are used to assist the end user to properly align the new or reground insert 22 with the reference face 56 of the cutterhead 10. The magnet is placed on the reference face 56 over the insert pocket 18. As the reground insert 22 is advanced along the ramp wall 32, the new reference edge 54' of the insert 22 approaches the magnet until the insert 22 touches the magnet. The magnet may then be used to hold the insert 22 while the wedge 24, clamps 26 and clamping screws 28 are tightened into the insert pockets 18. In another embodiment, the alignment is accomplished with a screw head or other flat surface, such that the means used to assist in aligning the insert blade reference edge 54' with the reference face 56 does not interfere with the cutting process.

Although the present invention has been described with reference to preferred embodiments, workers skilled in the art will recognize that changes may be made in form and detail without departing from the spirit and scope of the invention.

What is claimed is:

1. A method for reusing profile insert blades while maintaining axial, radial and profile dimensions of a cutting tool, the method comprising:

- duplicating an original profile on a used profile insert blade;
- sharpening a profile edge of the used profile insert blade to form a sharpened profile edge with a new profile that is shifted longitudinally along a length of the profile cutter blade relative to an original profile position;
- removing material from a reference edge of the sharpened profile insert blade to form a new reference edge of the sharpened profile insert blade to adjust the new profile longitudinally relative to the original profile position so the new adjusted profile has similar axial, radial and profile dimensions as the original profile; and
- installing the sharpened profile insert blade onto a rotating profile cutting tool comprising:
  - a tool body releasably attached to a spindle along a central axis, the cutting tool body having a reference face and a supply face, the cutting tool body having insert pockets extending into the cutting tool body, the insert pockets defining a ramp wall having a ramp angle other than zero degrees relative to the central axis; and
  - a clamping mechanism for clamping the sharpened profile insert blade in the insert pocket to prevent movement of the sharpened profile insert blade during use;
- wherein the sharpened profile insert blade is installed into one of the insert pockets such that a ramp edge contacts the ramp wall and the new reference edge is aligned with the reference face of the cutting tool body.

2. The method of claim 1, wherein the cutting tool includes a guide mechanism on the tool body extending parallel to the ramp wall from the supply face to the reference face along a trailing wall face of the insert pocket.

3. The method of claim 2, wherein the reusable profiled inserts have an insert guide sized to fit the guide mechanism, the insert guide extending from a supply edge to the reference edge of the reusable inserts, the method further comprising:

- mating the insert guide with the guide mechanism to ensure proper insertion and safety of the sharpened profile insert blade.

4. The method of claim 1, wherein the ramp wall includes one or more threaded bore holes sized to receive a hex clamping screw, the method further comprising:

- tightening one or more clamps against the ramp wall with the hex clamping screw.

5. The method of claim 1, wherein the insert pocket comprises:

- a trailing wall face;
- a leading wall face parallel to the trailing wall face;
- the ramp wall intersecting both the trailing wall face and the leading wall face; and
- an access face intersecting the leading wall face, the access face for providing chip clearance and for exposing a profile edge of the reusable insert.

6. The method of claim 1, wherein the ramp angle is between 1 degree and 89 degrees.

7. The method of claim 1, wherein the sharpened profile insert blade is a profile cutting knife having a profile cutting edge.

8. The method of claim 7, wherein, after installation, the profile cutting edge of the sharpened profile insert blade defines a monotonically decreasing effective blade radius.

9. The method of claim 1, wherein the ramp wall is stepped.

10. The method of claim 1, wherein the new adjusted profile has the same axial, radial and profile dimensions as the original profile within a margin of error of 1.5 mils.

11. The method of claim 1, wherein after duplicating the original profile on the used profile insert blade, the method further comprising:

inserting the profile insert blade into the insert pocket on the cutting tool;

aligning the reference edge of the profile insert blade with the reference face of the cutting tool;

clamping the profile insert blade into place with the clamping mechanism; and using the profiled insert blade.

12. The method of claim 1, the method further comprising:

evaluating wear on the profile insert blade; and removing the profile insert blade from the cutting tool for sharpening.

13. The method of claim 1, the method further comprising:

inserting the sharpened insert blade into the insert pocket on the cutting tool;

advancing the sharpened insert blade within the pocket until the new reference edge is aligned with a reference face of the cutting tool; and clamping the sharpened insert blade into position.

14. The method of claim 13, wherein the profile insert blades and the sharpened insert blades have a constant effective cutting profile through multiple regrindings.

15. The method of claim 1, wherein the profile insert blade has two parallel faces.

16. The method of claim 1, wherein the profile insert blade defines a monotonically changing effective blade radius along its length from a supply face to a reference face.

17. A method for reusing profile insert blades while maintaining axial, radial and profile dimensions of a cutting tool, the method comprising:

duplicating an original profile on a used profile insert blade;

sharpening a profile edge of the used profile insert blade to form a sharpened profile edge with a new profile that is shifted longitudinally along a length of the profile cutter blade relative to an original profile position;

removing material from a reference edge of the sharpened profile insert blade to form a new reference edge of the sharpened profile insert blade to adjust the new profile longitudinally relative to the original profile position so the new adjusted profile has similar axial, radial and profile dimensions as the original profile;

inserting the sharpened insert blade into a pocket on a cutting tool;

advancing the sharpened insert blade within the pocket until the new reference edge is aligned with a reference face of the cutting tool, wherein the step of advancing the sharpened insert blade comprises:

seating the sharpened insert blade within the pocket on the cutting tool such that a ramp edge of the sharpened insert blade contacts an advancing ramp of the pocket; and sliding the sharpened insert blade along the advancing ramp until the new reference edge of the sharpened blade is coplanar with the reference face of the cutting tool; and clamping the sharpened insert blade into position.

18. The method of claim 17, wherein the advancing ramp extends at an increasing effective radius from a supply face to the reference face of the cutting tool, the advancing ramp acting to shift the sharpened profile edge of the cutting blade radially outward along the length of the cutting blade as the cutting blade slides longitudinally toward the reference face.

19. A method for reusing profile insert blades while maintaining axial, radial and profile dimensions of a cutting tool, the method comprising:

duplicating an original profile on a used profile insert blade;

sharpening a profile edge of the used profile insert blade to form a sharpened profile edge with a new profile that is shifted longitudinally along a length of the profile cutter blade relative to an original profile position;

removing material from a reference edge of the sharpened profile insert blade to form a new reference edge of the sharpened profile insert blade to adjust the new profile longitudinally relative to the original profile position so the new adjusted profile has similar axial, radial and profile dimensions as the original profile;

inserting the sharpened reusable blade into an insert pocket of a cutting tool such that a ramp edge of the sharpened reusable blade abuts a back wall of the insert pocket;

advancing the sharpened reusable blade longitudinally within the insert pocket;

aligning the new reference edge with a reference face of the cutting tool; and fixing the sharpened reusable blade in the pocket;

wherein the sharpened reusable profiled insert blade maintains a cutting diameter, axial location and cutting profile substantially similar to the original profile without further adjustment by an end user.

20. The method of claim 19, further comprising:

examining a profile edge of the profile insert;

reprofiling the profile insert along the profile edge to a depth sufficient to eliminate surface chips and cracks and a dull used edge; and removing material along a reference edge of the profile insert proportional to the depth.

21. The method according to claim 20, wherein removing material along the reference edge effectively repositions the profile edge of the reprofiled profile insert to original radial and axial position according to original specifications.

22. The method according to claim 20, the method further comprising:

reprofiling the profile insert to match the original profile specification; and inserting the reprofiled insert into a cutting tool body to use without adjustment.

23. The method according to claim 22, wherein before inserting the reprofiled insert into the cutting tool body, the method further comprising:

sharpening a cutting edge of the reprofiled insert.

24. A method for reusing profile insert blades while maintaining axial, radial and profile dimensions of a cutting tool, the method comprising:

duplicating an original profile of a new profile insert blade on a used profile insert blade;

sharpening a profile edge of the used profile insert blade to form a sharpened profile edge with a new profile that is shifted relative to an original profile position; and removing material from a reference edge of the sharpened profile insert blade to form a new reference edge such that the new profile matches axial, radial and profile dimensions of the original profile;

inserting the sharpened insert blade into a pocket on a cutting tool;

advancing the sharpened insert blade within the pocket until the new reference edge is aligned with a reference face of the cuttings tool, wherein the step of advancing the sharpened insert blade comprises:

seating the sharpened insert blade within the pocket on the cutting tool such that a ramp edge of the sharpened insert blade contacts an advancing ramp of the pocket; and sliding the sharpened insert blade along the advancing ramp until the new reference edge of the sharpened blade is coplanar with the reference face of the cutting tool; and clamping the sharpened insert blade into the pocket to secure the new reference edge relative to the reference face.

25. The method of claim 24, wherein the new profile has the same axial, radial and profile dimensions as the original profile within a margin of error of 0.0015 inches.

26. The method of claim 24, the method further comprising:

evaluating wear on the used profile insert blade; and removing the used profile insert blade from the cutting tool for sharpening.

27. The method of claim 24, wherein the profile insert blades and the sharpened insert blades have a constant effective cutting profile through multiple regrindings.

28. The method of claim 24, further comprising:

fastening the sharpened insert blade on a cutting tool; and cutting with the cutting tool without further adjustment.

29. The method of claim 24, wherein the advancing ramp extends at an increasing effective radius from a supply face to the reference face of the cutting tool, the advancing ramp acting to shift the sharpened profile edge of the cutting blade radially along the length of the cutting blade as the cutting blade slides toward the reference face.

30. A method for reusing profile insert blades while maintaining axial, radial and profile dimensions of a cutting tool, the method comprising:

duplicating an original profile of a new profile insert blade on a used profile insert blade;

sharpening a profile edge of the used profile insert blade to form a sharpened profile edge with a new profile that is shifted relative to an original profile position; and removing material from a reference edge of the sharpened profile insert blade to form a new reference edge such that the new profile matches axial, radial and profile dimensions of the original profile inserting the sharpened profile insert blade into an insert pocket of a cutting tool such that a ramp edge of the sharpened profile insert blade abuts a back wall of the insert pocket;

advancing the sharpened profile insert blade within the insert pocket;

aligning the new reference edge with a reference face of the cutting tool; and fixing the sharpened profile insert blade in the pocket;

wherein the sharpened profile insert blade maintains a cutting diameter, axial location and cutting profile substantially similar to the original profile without further adjustment by an end user.

31. The method of claim 33, wherein the duplicating act comprises:

reprofiling the profile insert along the profile edge to a depth sufficient to eliminate surface chips and cracks and a dull used edge;

reprofiling the profile insert to match an original profile specification of the profile insert; and removing material along a reference edge of the profile insert proportional to the depth.

32. The method for sharpening a profile insert according to claim 31, wherein removing material along the reference edge effectively repositions the profile edge of the reprofiled profile insert to an original radial and axial position according to original specifications for the profile insert.

33. The method for sharpening a profile insert according to claim 31, wherein the steps are repeated each time the profile insert becomes dull or has chips or cracks along the profile edge.

34. The method for sharpening a profile insert according to claim 31 further comprising:

sharpening a cutting edge of the profiled insert.

* * * * *

UNITED STATES PATENT AND TRADEMARK OFFICE

CERTIFICATE OF CORRECTION

PATENT NO. : 6,811,362 B2
DATED : November 2, 2004
INVENTOR(S) : Ernest R. Wallin et al.

It is certified that error appears in the above-identified patent and that said Letters Patent is hereby corrected as shown below:

Column 5,
Line 17, delete “44”.

Column 17,
Line 10, delete “cuttings” insert therefore -- cutting --.

Signed and Sealed this

First Day of February, 2005

JON W. DUDAS
*Director of the United States Patent and Trademark Office*